(12) United States Patent
Kampe et al.

(10) Patent No.: US 10,579,310 B2
(45) Date of Patent: *Mar. 3, 2020

(54) SYSTEM AND METHOD FOR RELIABLY PERSISTING STORAGE WRITES AT HIGH SPEED

(71) Applicant: Futurewei Technologies, Inc., Plano, TX (US)

(72) Inventors: Mark Allan Kampe, Los Angeles, CA (US); Cameron Bahar, Los Altos, CA (US); Jinshui Liu, Frisco, TX (US); Wesley Shao, Cupertino, CA (US); Huawei Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,212

(22) Filed: Dec. 27, 2017

(65) Prior Publication Data

US 2018/0121138 A1 May 3, 2018

Related U.S. Application Data

(62) Division of application No. 14/688,718, filed on Apr. 16, 2015, now Pat. No. 9,870,177.

(51) Int. Cl.
*G06F 3/06* (2006.01)
*G06F 11/00* (2006.01)

(52) U.S. Cl.
CPC ............ *G06F 3/0683* (2013.01); *G06F 3/065* (2013.01); *G06F 3/0619* (2013.01); *G06F 11/00* (2013.01)

(58) Field of Classification Search
CPC ...... G06F 3/0683; G06F 3/0619; G06F 3/065; G06F 11/00
See application file for complete search history.

(56) References Cited

U.S. PATENT DOCUMENTS

2005/0256972 A1 11/2005 Cochran et al.
2007/0198796 A1* 8/2007 Warren, Jr. ......... G06F 12/0804
711/165

* cited by examiner

*Primary Examiner* — Eric Cardwell
(74) *Attorney, Agent, or Firm* — Slater Matsil, LLP

(57) ABSTRACT

A method for operating a device adapted to store information with high reliability includes determining a storage address for a data payload portion of a write request in accordance with a configuration of a communications interface coupled to the device, where the data payload is to be stored in mirroring groups of cache storage partitions of a plurality of cache storage modules. The method also includes generating a payload read request in accordance with the storage address, and prompting the communications interface to initiate the storing of the data payload, in parallel, in the mirroring groups in accordance with the payload read request.

20 Claims, 11 Drawing Sheets

SYSTEM AND METHOD FOR RELIABLY PERSISTING STORAGE WRITES AT HIGH SPEED

This application is a divisional of U.S. patent application Ser. No. 14/688,718, filed on Apr. 16, 2015 and entitled "System and Methods for Reliably Persisting Storage Writes at High Speed," which application is hereby incorporated by reference herein as if reproduced in its entireties.

TECHNICAL FIELD

The present disclosure relates generally to digital communications, and more particularly to a system and method for reliably persisting storage writes with minimal latency.

BACKGROUND

Generally, a storage system includes a network (e.g., Ethernet, Fibre Channel (FC), Infiniband, and the like), a network interface, a processor, and a storage device (such as, magnetic disk, flash memory, and so on). Two key goals for computer storage products are low write latency (prompt acknowledgement of writes) and reliable persistence (after the write has been acknowledged, the data is safe).

In order to improve performance, the processor often includes random access memory (RAM) to be used as a read cache or some form of non-volatile memory to be used as a write-back cache. Reliability typically requires that newly written data be safely stored in two (or more) distinct failure domains. A traditional solution uses direct memory access (DMA) to store a write request in RAM, after which the data is copied to a second location (e.g., more RAM or non-volatile RAM (NVRAM) in a separate controller) by the processor or a DMA controller. This copying of the data takes time and consumes bus bandwidth, thereby limiting the achievable response time and throughput.

SUMMARY OF THE DISCLOSURE

Example embodiments of the present disclosure which provide a system and method for reliably persisting storage writes at high speed.

In accordance with an example embodiment of the present disclosure, a method for operating a device adapted to store information with high reliability is provided. The method includes determining, by the device, a storage address for a data payload portion of a write request in accordance with a configuration of a communications interface coupled to the device, wherein the data payload is to be stored in mirroring groups of cache storage partitions of a plurality of cache storage modules, generating, by the device, a payload read request in accordance with the storage address, and prompting, by the device, the communications interface to initiate the storing of the data payload in the mirroring groups in accordance with the payload read request.

In accordance with another example embodiment of the present disclosure, a device adapted to store information with high reliability is provided. The device includes a processor, and a computer readable storage medium storing programming for execution by the processor. The programming including instructions to determine a storage address for a data payload portion of a write request in accordance with a configuration of a communications interface coupled to the device, wherein the data payload is to be stored in mirroring groups of cache storage partitions of a plurality of cache storage modules, generate a payload read request in accordance with the storage address, and prompt the communications interface to initiate the storing of the data payload in the mirroring groups in accordance with the payload read request.

In accordance with another example embodiment of the present disclosure, a write-back cache is provided. The write-back cache includes a plurality of cache storage modules, a processor operatively coupled to the plurality of cache storage modules, and a computer readable storage medium storing programming for execution by the processor. The plurality of cache storage modules stores data, the plurality of cache storage modules comprising a combination of volatile and non-volatile cache modules partitioned into cache storage partitions that are organized into mirroring groups. The programming including instructions to select a mirroring group for a data payload portion of a write request, transfer the data payload portion in parallel to buffers in the selected mirroring group.

One advantage of an embodiment is that the storage of data is mirrored and/or multi-cast directly from a network interface card (NIC) to NVRAM controller in a single step, resulting in a significant time savings.

A further advantage of an embodiment is that the transfer of the data is made directly from the NIC to the NVRAM controller with no interaction with the processor or the processor's memory bus. Thereby reducing the load on the processor, allowing it to perform other operations.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

This disclosure relates to a general approach to reliably persisting storage writes. This involves defining mirroring groups of volatile and/or non-volatile memory where write payloads can be cached. For each incoming write request, we will select a mirroring group and specific buffer(s) within that mirroring group. Then we will (in different ways depending on the capabilities of the fabric interconnecting the network interfaces and storage devices) instruct the network interface and/or interconnecting fabric to deliver the write payload (directly and simultaneously) to the corresponding buffers in each device in the chosen mirroring group. The present disclosure will be described with respect to example embodiments in a specific context, namely storage systems that offer low write latency and reliable persistence. The disclosure may be applied to storage systems where the client-to-storage server communications protocols that support multi-cast writes, as well as those that do not support multi-cast writes.

Figure 1:
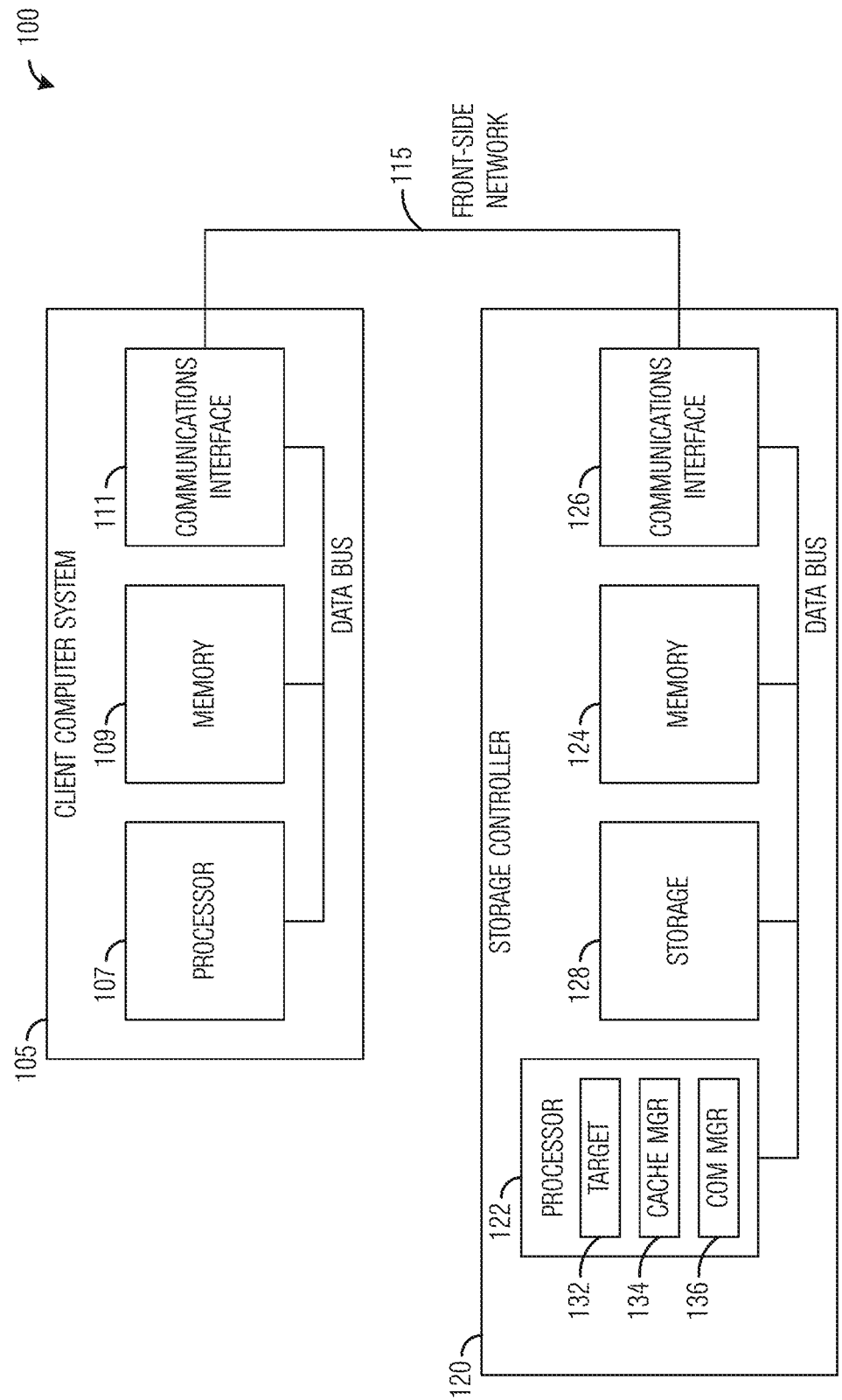
FIG. 1 illustrates an example traditional storage client and server system.

FIG. 1 illustrates an example traditional storage client and server system 100. Computing system 100 includes a client computer system 105 and a storage controller 120 coupled by a front-side network 115. A client application, running on client computer system 105, may issue a write request by sending a message through a communications interface 111, over front-side network 115, to storage controller 120. The message, which includes both a description of the request and data to be written, is received by communications interface 126 of storage controller 120 and copied into memory 124. A processor 122 of storage controller 120 may copy the data to an appropriate location in storage 128, also commonly referred to as storage device. While it is understood that computing systems may employ multiple client computer systems capable of communicating with a number of storage controllers, only one computer system and one storage controller are illustrated for simplicity.

Unfortunately, most forms of storage are relatively slow and withholding the sending of an acknowledgement regarding successful completion of the write back to client computer system 105 until the write to storage 128 has completed may introduce unacceptable delays. A write-back cache is a commonly used technique to help reduce acknowledgement latency. When implementing a write-back cache, storage controller 120 may send back an acknowledgement as soon as it receives the write message from client computer system 105 in memory 124. Storage controller 120 may then make a permanent copy of the data to storage 128 as a background activity without forcing client computer system 105 to wait. Additionally, write-back caches can also reduce a number of writes to storage 128, thereby improving their efficiency. However, failures may occur at storage controller 120 prior to the data stored in memory 124 being written to storage 128, resulting in the loss of the data in the write-back cache.

Figure 2:
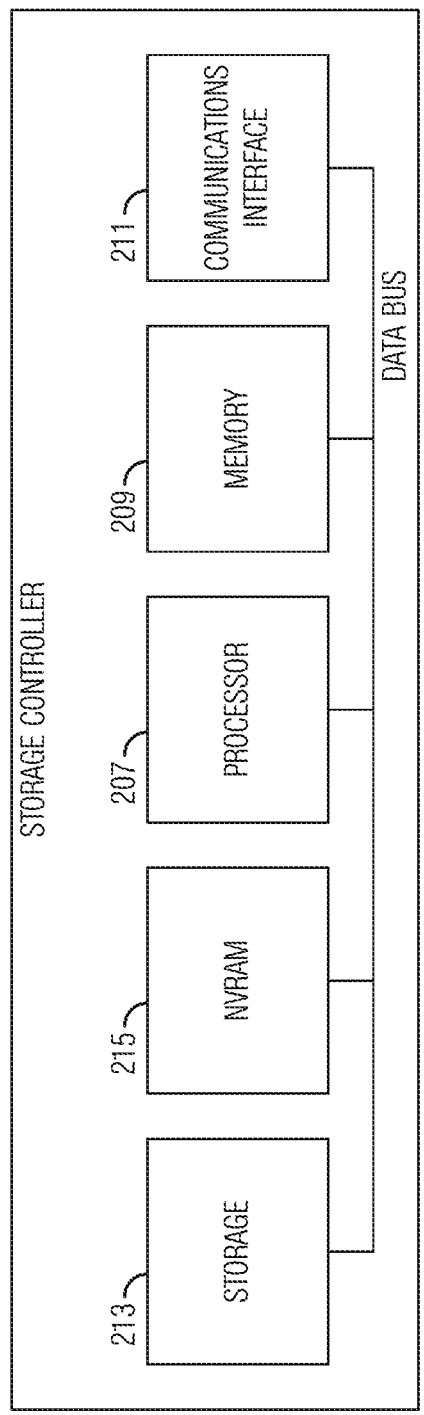
FIG. 2 illustrates an example traditional storage controller configured as a write-back cache with NVRAM

FIG. 2 illustrates an example traditional storage controller 200 configured as a write-back cache with NVRAM. Similar to storage controller 120, storage controller 200 includes processor 207, memory 209, communications interface 211, and storage 213. However, storage controller 200 also includes NVRAM 215. Data stored in NVRAM 215 will survive power failures, software crashes, and the like, and can be recovered when storage controller 200 is restarted. Data from a write request may be stored more reliably in NVRAM 215 than in memory 209 while awaiting delivery to storage 213.

However, if a hard failure occurs in storage controller 200, it may be impossible to reboot storage controller 200 and data stored in NVRAM 215 may not be recoverable. Therefore, a write-back cache with NVRAM in a single controller is an incomplete solution.

Figure 3:
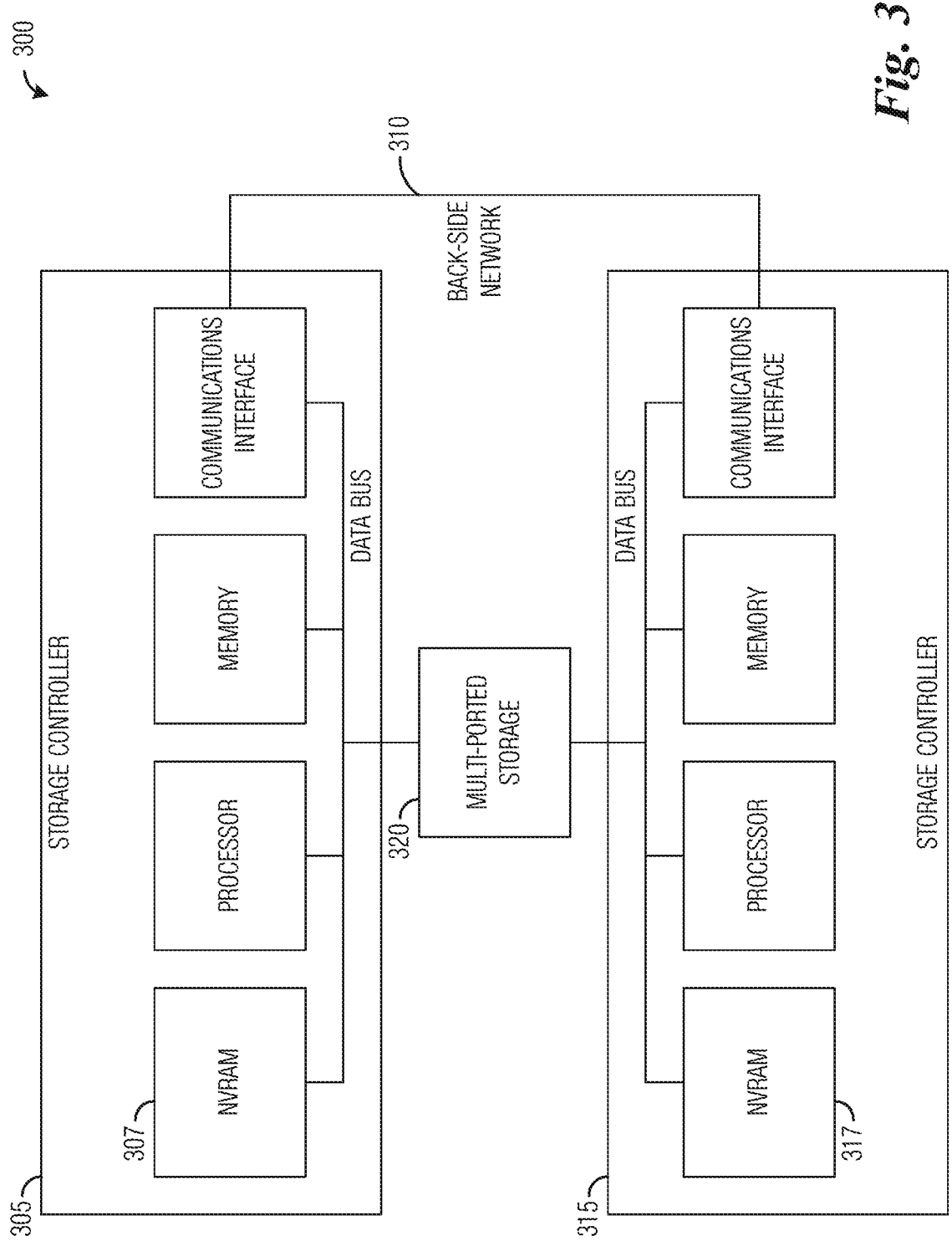
FIG. 3 illustrates an example traditional storage system with two storage controllers.

FIG. 3 illustrates an example traditional storage system 300 with two storage controllers. Storage system 300 includes two storage controllers, storage controller 305 and storage controller 315. The storage controllers feature NVRAM, such as NVRAM 307 for storage controller 305 and NVRAM 317 for storage controller 315. The use of two (or more) storage controllers in separate failure domains help to ensure that no single failure can destroy all copies of the data. It is noted that the two storage controllers may be identical or they can be different.

As shown in FIG. 3, data from a write request may be stored in NVRAM 307 of storage controller 305. A copy of the write request may be sent to storage controller 315 over back-side network 310, where the data is stored in NVRAM 317 of storage controller 315. An acknowledgement from storage controller 315 may be sent back to storage controller 305. Upon receipt of the acknowledgement, there are two copies of the data in distinct failure domains and it is then safe to acknowledge successful completion of the write request. The data stored in NVRAM (NVRAM 307 and NVRAM 317) may be written to multi-ported storage 320 as a background operation.

Figure 4:
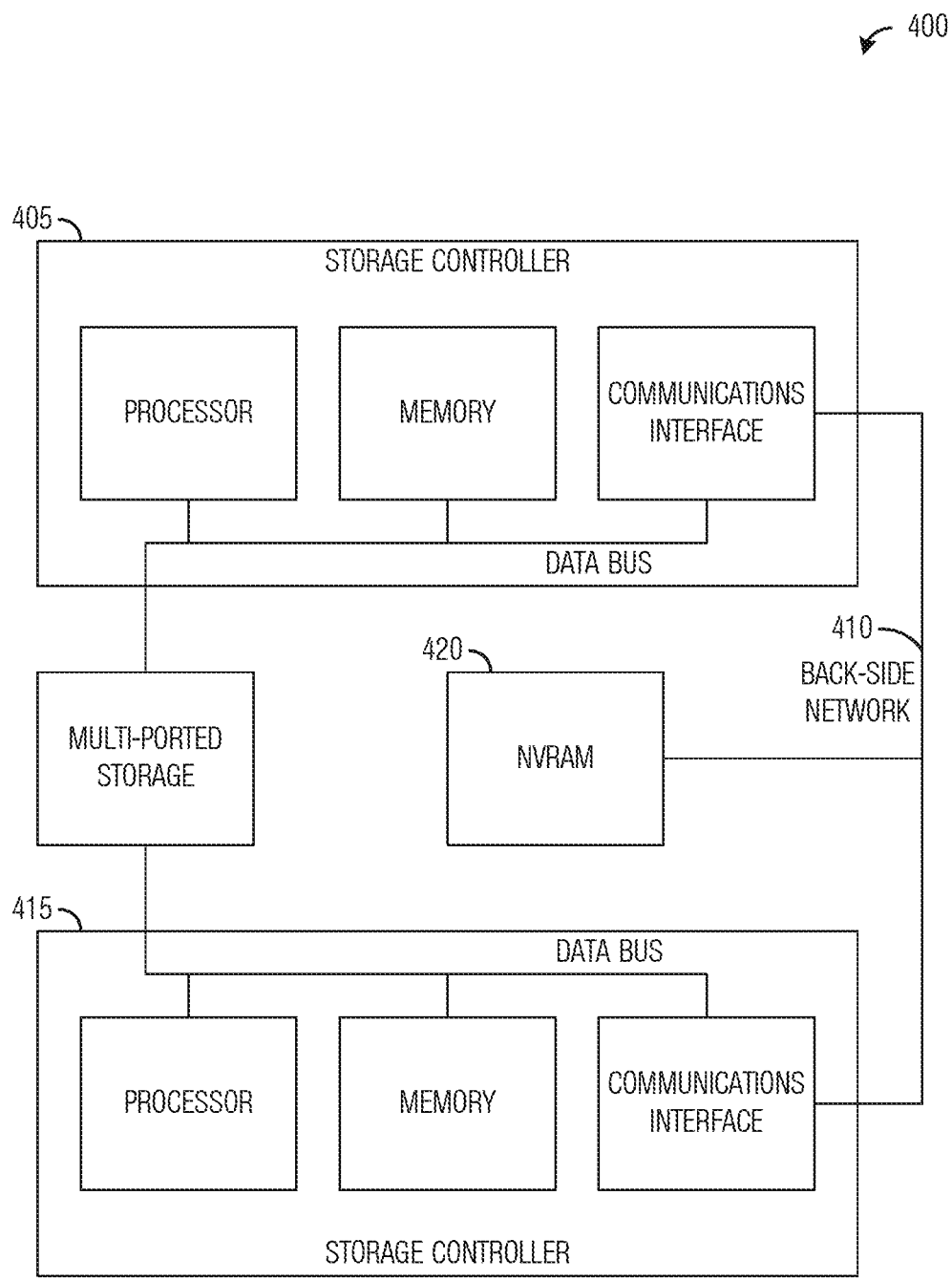
FIG. 4 illustrates an example storage system highlighting an alternative two storage controller configuration with NVRAM modules outside of the controllers.

FIG. 4 illustrates an example storage system 400 highlighting an alternative two storage controller configuration with NVRAM modules outside of the controllers. Storage system 400 includes two storage controllers, storage controller 405 and storage controller 415 that are coupled via back-side network 410. Unlike the two storage controllers shown in FIG. 3, the two storage controllers shown in FIG. 4 do not each have their own NVRAM. Rather than separate NVRAM modules in each controller, a shared NVRAM 420 is connected to back-side network 410. Although shown in FIG. 4 as single entity, NVRAM 420 may comprise multiple shared NVRAMs, spread across multiple different fault domains Eliminating the NVRAM modules integrated into each storage controller may reduce costs while offering flexibility, serviceability, and opportunities for off-loading the storage controllers.

In order to ensure adequate reliability against failure before a write-back cache can be flushed to persistent storage, two or more copies (with at least one of which being stored in non-volatile memory to ensure survivability in a power failure) may need to be made. A storage controller with a reliable write-back cache may contain multiple cache storage modules in which data can be kept until the data has been safely written out to persistent storage. The cache storage modules may be any combination of volatile memory in storage controllers, non-volatile memory in storage controllers, and independent non-volatile memory modules. A choice of internal or independent non-volatile memory, or keeping copies in volatile memory may be driven by capacity and/or cost considerations. For the purposes of this discussion, the general term "cache storage modules" may refer to any combination of the above listed forms of memory.

However, there are disadvantages to replicating write payloads to another controller (as in FIG. 3) or an independent NVRAM module (as in FIG. 4), including:

The time required for storage controller 405 to send a copy of the data to NVRAM 420 and to receive an acknowledgement from storage controller 415 is not negligible.

The processor load on storage controller 405 to generate copy requests and process acknowledgements is also not negligible.

The bus cycles of storage controller 405 to transmit the data to NVRAM 420 are also not negligible.

According to an example embodiment, it is more efficient to directly and simultaneously copy incoming write requests from the communications interface to two (or more) storage controllers and/or NVRAM controllers. This may be referred to as multi-cast mirroring. However, most of the protocols used to deliver requests from a client system to a storage controller include no provisions for such mirroring. Since remote data access protocols are generally standardized, it is both difficult and time-consuming to get extensions adopted for standardization purposes. Therefore it is highly desirable to find a way to achieve multi-cast mirroring without requiring any changes to the existing client-to-storage-server protocols.

Multi-casting may be performed in many protocols by taking a single message (sent by one source) and delivering copies of the single message to multiple destinations. One way to achieve this is to define a multi-cast address that maps to a multi-cast group. A message sent to the multi-cast address will be recognized by the multi-cast fabric and retransmitted to each address in the multi-cast group. Generally, this is performed in higher level protocols. However, it may be possible to implement multi-cast even in situations where the chosen protocols do not support it.

According to an example embodiment, a multi-cast fabric is configured to mirror data from write requests that fall within a specified address range. The multi-cast fabric may enable direct mirroring of write requests to two or more storage controllers and/or NVRAM controllers without having to modify standardized remote data access protocols that govern communication between the client (sometimes called an initiator) and server (sometimes called a target). The use of the specified multi-cast address range may enable mirroring for some requests (e.g., writes) and not mirror other requests (e.g., reads). The destinations of the mirrored write requests may also be configured in the multi-cast fabric.

According to an example embodiment, making two or more copies of data in a single DMA transfer between a communications interface and storage modules eliminates the latency and processing associated with having to perform a second transfer to make a second copy. If storage modules are not located on primary input/output buses of storage controllers, an additional advantage of removing a significant amount of traffic off of the input/output buses may be realized, resulting in reduced latency and increased processing efficiency.

In general, if C copies (where C is an integer value greater than 1) are to be made, it may be possible to choose random buffers from each of C distinct cache storage modules. It may be simpler to divide each cache storage module into equal sized cache storage partitions and organize the cache storage partitions into mirroring groups (with each containing one cache storage partition from C distinct cache storage modules). Individual buffers within a mirroring group may be managed so that the same data is stored at the same location of each cache storage partition within the mirroring group. That is to say that the Nth buffer in each partition of a mirroring group will contain a copy the same data, where N is an arbitrary integer value representing a buffer index in each partition of the mirroring group.

According to an example embodiment, a buffer management strategy that partitions available cache storage modules into mirroring groups and creates a multi-cast address space that can deliver writes to all members (i.e., cache storage partitions) of each mirroring group is provided.

According to an example embodiment, a multi-part write request handling process that examines write request headers, determines where the data should be placed, and directs the write payloads (e.g., data) to the chosen locations in the chosen mirroring groups is provided.

Header and data separation by an intelligent communications interface is used to enable the inspection of write requests independently and potentially before receiving the data payload. According to an example embodiment, header and data separation is used to send the header to the storage controller and the data to the multi-cast fabric. Therefore, the storage controller does not have to spend valuable resources on receiving and/or processing the data.

Figure 5:
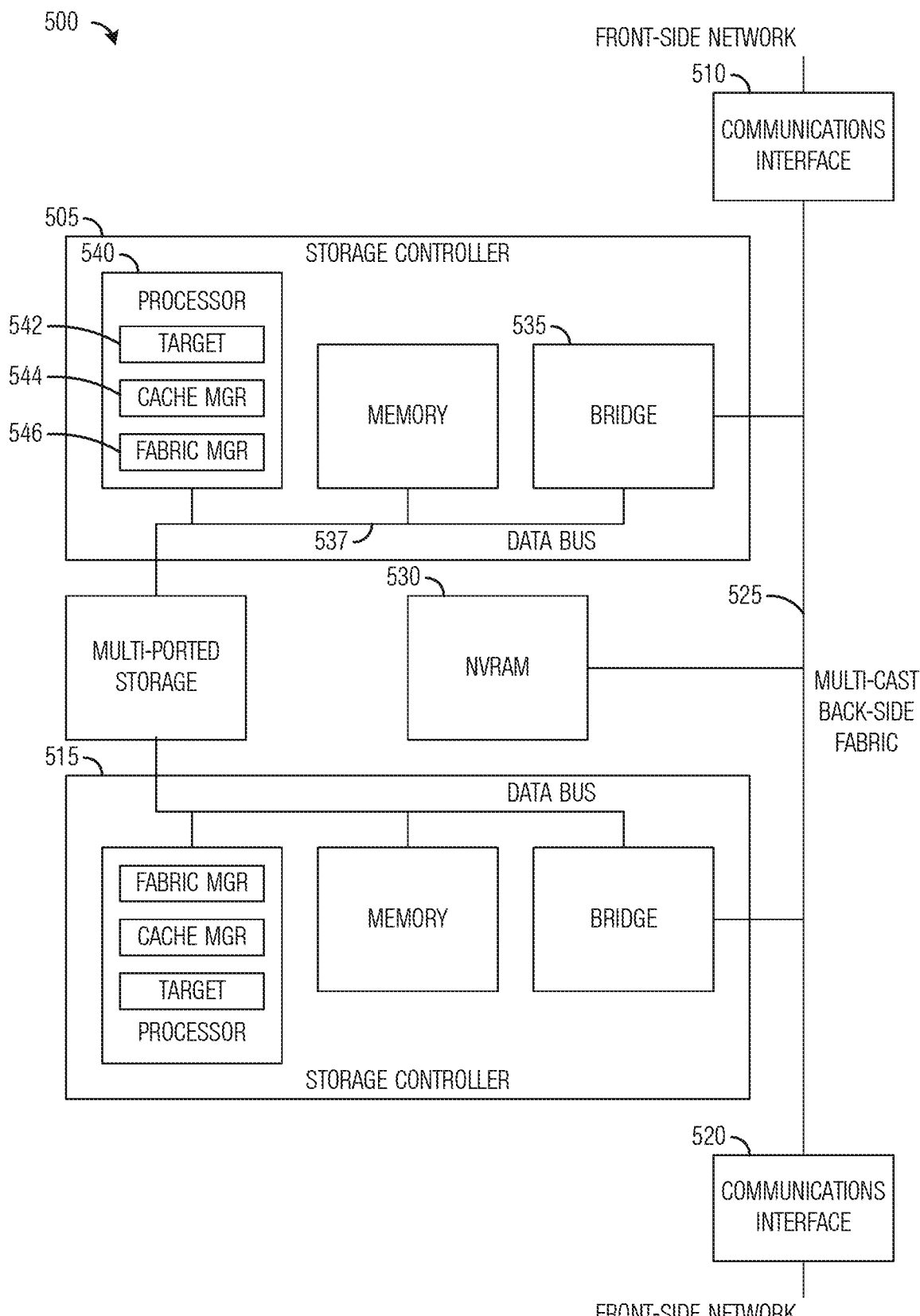
FIG. 5 illustrates an example storage system with NVRAM outside of the controllers, highlighting the use of multi-cast fabric according to example embodiments described herein.

FIG. 5 illustrates an example storage system 500 with shared NVRAM outside of the controllers, highlighting the use of multi-cast fabric. Storage system 500 includes storage controllers 505 and 515. Each storage controller may include a communications interface, such as communications interface 510 for storage controller 505 and communications interface 520 for storage controller 515. Unlike the storage controllers discussed previously, these communications interfaces are not directly connected to the busses of their respective controllers. Rather, they are on an independent bus and are connected to their respective storage controllers through a bridge, such as bridge 535 of storage controller 505. This makes it possible for transfers between the communications interfaces and cache modules to be taken off of the controller busses (for example, data bus 537 of storage controller 505). The storage controllers (as well as their communications interfaces) are coupled together by a multi-cast back-side fabric 525 which supports multi-cast to multi-cast groups. NVRAM 530 is also coupled to the storage controllers by multi-cast back-side fabric 525. As discussed previously, although shown as a single entity, NVRAM 530 may comprise multiple modules separately accessible by the storage controllers and in different fault domains.

Processor 540 of storage controller 505 may include modules referred to as target 542, cache manager 544, and fabric manager 546. Although not discussed in detail, storage controller 515 may also have a processor similarly configured as processor 540 of storage controller 505, and the discussion of processor 540 also applies to the processor of storage controller 515.

Cache manager 544, during initialization, may partition available cache storage modules and establish mirroring relationships between storage controllers and partitions. Fabric manager 546 may generate a multi-cast address space to implement those mirroring relationships, and programs multi-cast back-side fabric 525 in accordance with the multi-cast address space.

When an incoming write request is received, target 542 may decode the header of the write request, recognize it as a write request, and forward the request to cache manager 544. Cache manager 544 may allocate appropriate buffers to receive the copies of the payload of the write request. Cache manager 544 may consult the fabric manager 546 to obtain a multi-cast address corresponding to the chosen buffers, and return this to target 542. Target 542 may construct an appropriate read request (to transmit the payload to the chosen buffers) and submit it to communications interface 510 (with assistance from an appropriate network stack, for example).

When the network interface directs the data payload to the specified multi-cast address, back-side fabric 525 may automatically deliver a copy to each of the devices in the addressed mirroring group (in accordance with the multi-cast address space created by fabric manager 546 during initialization). Thereby eliminating the need to perform additional operations to make the multiple copies.

As discussed previously, a properly addressed write request arriving at communications interface 510 may have its data multi-cast to NVRAM 530 and different modules therein, while a header of the write request may be sent to storage controller 505. A similar multi-cast operation may occur for properly address write requests arriving at communications interface 520.

Figure 6:
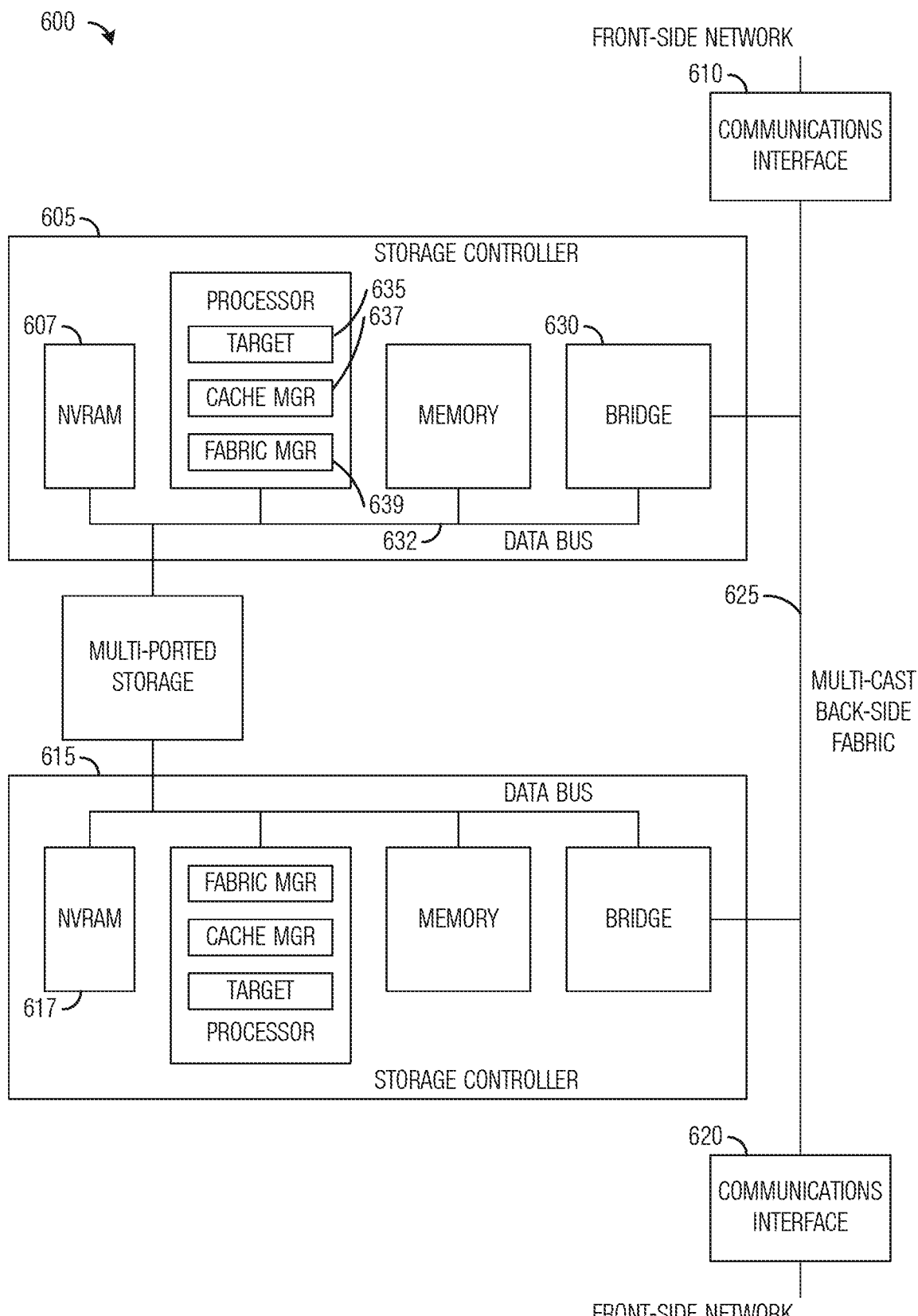
FIG. 6 illustrates an example storage system where the NVRAM modules are integrated into the controllers, highlighting the use of multi-cast fabric according to example embodiments described herein.

FIG. 6 illustrates an example storage system 600 where the NVRAM modules are integrated into the controllers, highlighting the use of multi-cast fabric. Storage system 600 includes storage controllers 605 and 615. Each storage controller may include a communications interface, such as communications interface 610 for storage controller 605 and communications interface 620 for storage controller 615. Like the storage controllers discussed in FIG. 5, the communications interfaces shown in FIG. 6 are not directly connected to the busses of their respective storage controllers. The storage controllers (as well as their communications interfaces) are coupled together by a multi-cast back-side fabric 625 which supports multi-cast to multi-cast groups. The storage controllers include integrated NVRAM modules, e.g., NVRAM 607 for storage controller 605 and NVRAM 617 for storage controller 615.

Storage controller 605 may also include a bridge 630. Bridge 630 may enable local memory (volatile and/or non-volatile) to be used as a DMA target for operations on multi-cast back-side fabric 625, as well as translating between addresses of multi-cast back-side fabric and addresses on the local data bus, such as data bus 632 for storage controller 605. Although not discussed in detail, storage controller 615 may also have a bridge similarly configured as bridge 630 of storage controller 605, and the discussion of bridge 630 also applies to the bridge of storage controller 615.

As discussed previously for FIG. 5, an incoming write request arriving at communications interface 610 may have buffers allocated, and a multi-cast address determined, to which the write-payload will be directed, causing the data to be automatically mirrored to storage controller 605 and storage controller 615. A similar mirroring operation may occur for write requests arriving at communications interface 620. This example embodiment offers the same advantage in terms of eliminating the need for a second operation to make a copy. But, because the NVRAM (e.g., NVRAM 607) is directly attached to the bus (e.g., bus 632) of its owning controller (e.g., storage controller 605) this example embodiment does not achieve the reduction in bus traffic as the example embodiment described by FIG. 5.

Figure 7:
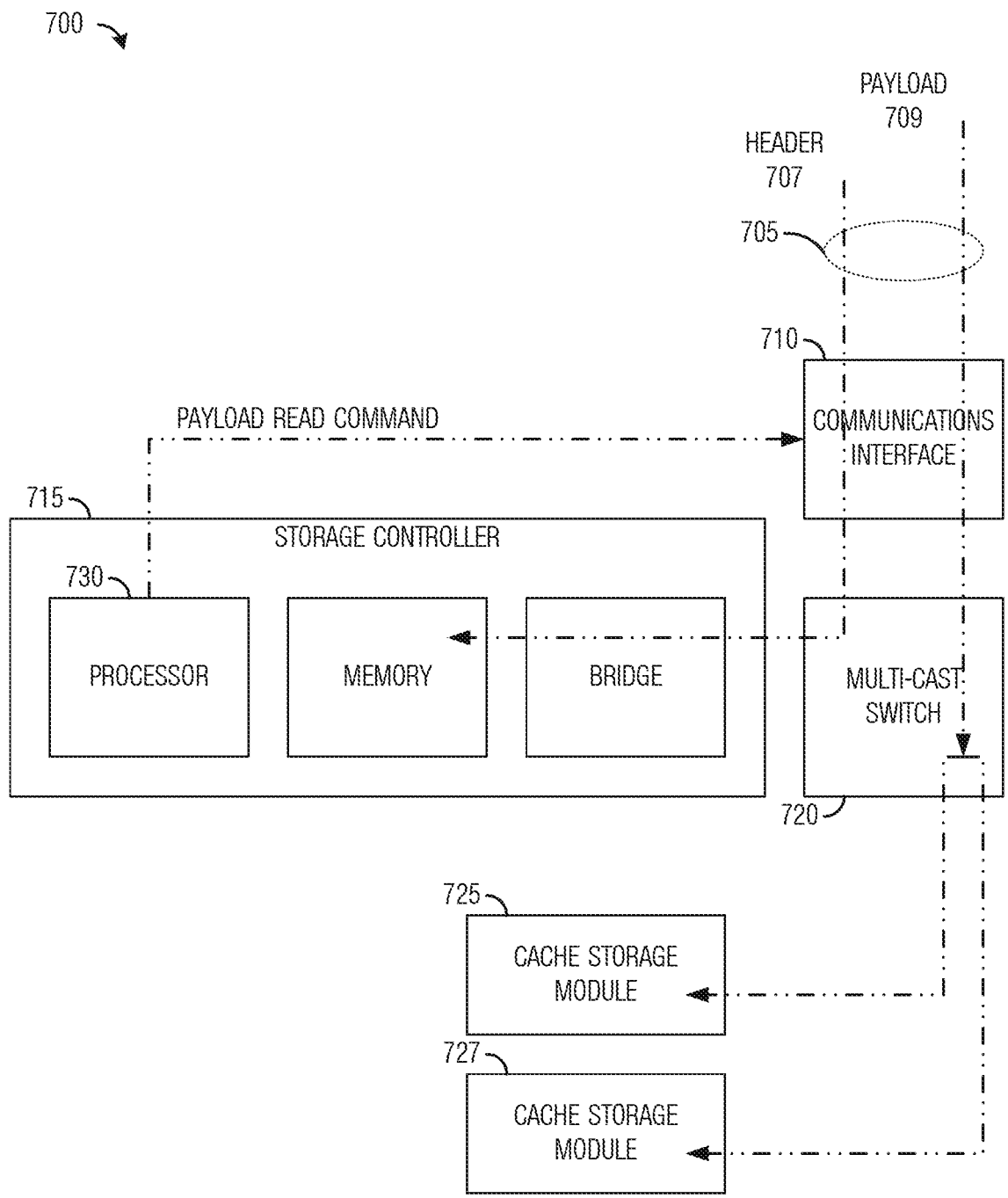
FIG. 7 illustrates an example data flow diagram, highlighting multi-cast operation to NVRAM cache storage modules according to example embodiments described herein.

FIG. 7 illustrates an example data flow diagram 700, highlighting multi-cast operation. Data flow diagram 700 may be illustrative of data flows for storage systems 500 and 600 shown in FIGS. 5 and 6. A write request 705 comprising a header 707 and a payload (data) 709 may be received by communications interface 710. Since communications interface 710 supports header and/or data separation, only header 707 is initially delivered to storage controller 715. Header 707 is examined by processor 730 to determine where payload 709 is to be stored. As an illustrative example, a mirroring group is selected and an appropriate buffer from within the mirroring group is selected. In a situation when buffers within cache storage partitions are maintained in fixed size pages, multiple buffers may need to be allocated for payloads larger than the defined page size.

A multi-cast address is determined by processor 730 and provided to multi-cast switch 720 (which might implement the multi-cast back-side fabrics as shown in FIGS. 5 and 6). If multiple buffers have been selected because the request is too large to fit in a single buffer, multiple multi-cast addresses may need to be determined. A read request may be generated in accordance with the multi-cast address(es) and provided to communications interface 710. Communications interface 710 may initiate DMA transfers to the multi-cast address(es), which will result in payload 709 being sent to cache storage modules, such as cache storage module 725 and cache storage module 727, for example. If the transfer completes successfully, cache indices (recovery metadata describing which data is currently stored in which buffers) may be updated.

Figures 8A, 8B:
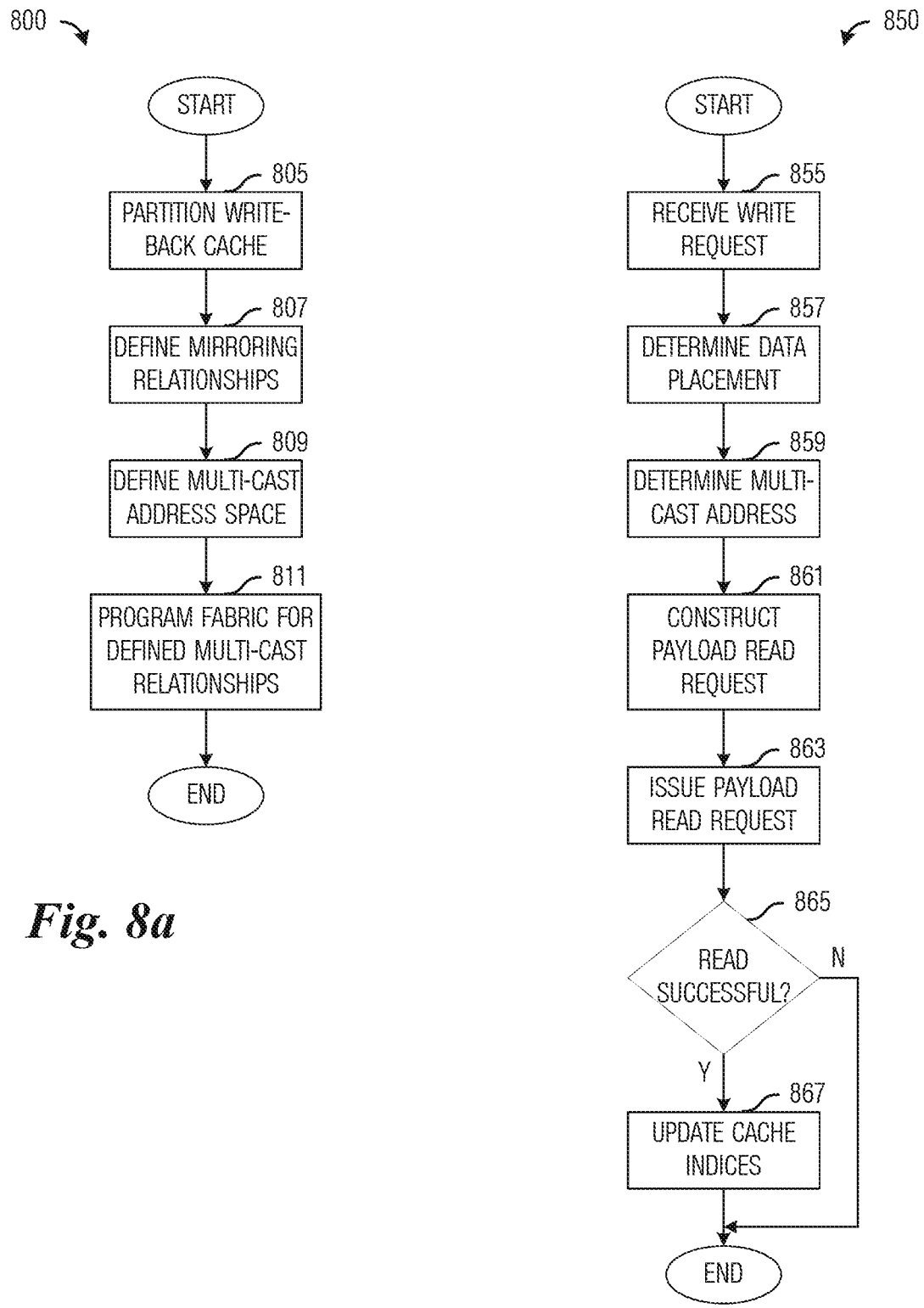
FIG. 8a illustrates a flow diagram of example operations occurring in a processor of a storage controller participating in initialization of a storage system for multi-cast write requests according to example embodiments described herein.
FIG. 8b illustrates a flow diagram of example operations occurring in a processor of a storage controller participating in processing a write request in a storage system utilizing multi-cast write requests according to example embodiments described herein.

FIG. 8a illustrates a flow diagram of example operations 800 occurring in a processor of a storage controller participating in initialization of a storage system for multi-cast write requests. The initializing of the storage system may begin with the partitioning of the write-back cache (e.g., volatile or non-volatile memory) into smaller cache storage partitions (block 805). The partitions should be equal in size. As an illustrative example, if there are S storage controllers, M cache storage modules, and C copies to be made, the minimum number of cache storage partitions is equal to the least common multiple of S*C, and M. It is noted that faster (many-to-many) recovery may be obtained if the chosen number of cache storage partitions is at least S times the least common multiple of S*C and M, as this makes it possible to redistribute the work load from a failed storage controller among all of the remaining storage controllers. Even greater multiples may be used if support for dynamic load distribution is intended since larger numbers of cache storage partitions enable redistribution of capacity in small increments.

The defining of mirroring relationships may be performed (block 807). The mirroring relationships are between the cache storage partitions and the storage controllers. If P partitions have been formed (in step 805), they may be organized into P/C mirroring groups, where no two partitions in a single group are from the same cache storage module, wherein P is an integer value. There are many different ways to form such mirroring groups. If the mirroring groups associated with a particular controller are spread over a larger number of cache storage modules, this will enable a faster many-to-many recovery in case of a failure of either a controller or cache storage module.

A multi-cast address space may be defined (block 809). The multi-cast address space may be defined to enable the mirroring relationships defined in block 807. For each defined mirroring group, a portion of the address space of the back-side fabric may need to be allocated for writes to be mirrored to associated cache storage modules. In block 811 the switch or switches that are used to implement the back-side fabric may be programmed to implement the defined mirroring groups.

While other implementations are possible, as a best practice, the mirroring groups should be defined during initialization or re-initialization rather than at the beginning of each write payload transfer. Furthermore, the mirroring groups should be defined for sets of cache module partitions (each of which may include a large number of buffers) instead of individual sets of buffers. A multi-cast write to an offset within a designated multi-cast address range would be translated, by the back-side fabric, for example, into multiple writes to the same offset within each of the partitions assigned to the mirroring group.

FIG. 8*b* illustrates a flow diagram of example operations 850 occurring in a processor of a storage controller participating in processing a write request in a storage system utilizing multi-cast write requests. The processing of a write request may begin with receiving a write request header (block 855). The write request may be received by a communications interface. Since the communications interface may support header/payload separation, the header may be delivered to the storage controller, and the payload held for separate delivery.

The header may be processed. The processing of the header may include determining where to store the payload of the write request (block 857). As an illustrative example, a mirroring group may be selected from those defined during initialization. Additionally, an appropriate buffer within the mirroring group may be selected. It is noted that in storage systems where buffers in the cache storage partitions are maintained in fixed sized pages, multiple buffers may be allocated for write requests that include payloads larger than the defined page size.

The multi-cast address(es) may be determined (block 859). The multi-cast address(es) may be the address that will result in the delivery of the payload to the chosen buffers. The address may be determined as a base address for the selected mirroring group plus an offset of the selected buffer within the mirroring group. If multiple buffers have been selected, multiple multi-cast addresses must be determined.

A read request may be generated (block 861). The read request may be generated using the multi-cast address(es) as a destination. If multiple buffers have been selected, the read request may include a scatter list of multiple buffers, with each successive buffer to receive a consecutive page of the payload. The read request may be issued (block 863). The read request may be sent to the communications interface, instructing it to transfer the payload to the chosen buffer(s). The communications interface may initiate DMA transfers to the addresses specified in the read request. Switch(es) in the back-side fabric may recognize the addresses are multi-cast address and send copies of the payload to the cache storage modules defined for the mirroring group.

A check may be performed to determine if the read request was successful (block 865). If the read request was successful, cache indices may be updated to reflect the new cache contents (block 867).

There may be many back-side fabrics that are not capable of supporting multi-casts. In such a situation, similar performance may be obtained by using communications interfaces that have multiple DMA controllers and are capable of simultaneously (or substantially simultaneously) transmitting a message to multiple independent buffers.

Figure 9:
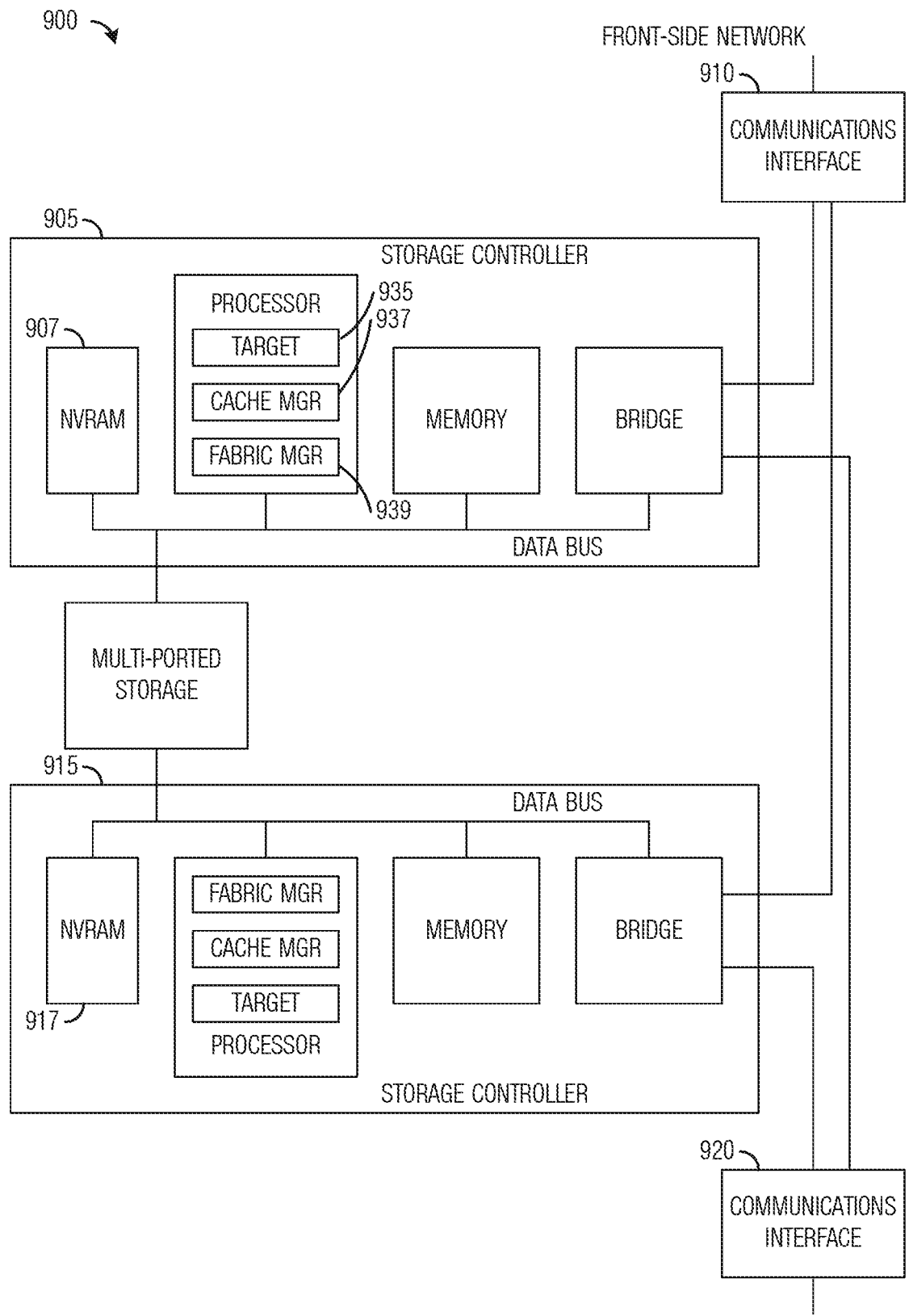
FIG. 9 illustrates an example storage system with per controller NVRAM modules, but without use of multi-cast fabric according to example embodiments described herein.

FIG. 9 illustrates an example storage system 900 with separate NVRAM, but without use of multi-cast fabric. Storage system 900 includes storage controllers 905 and 915. Each storage controller may include a communications interface, such as communications interface 910 for storage controller 905 and communications interface 920 for storage controller 915. The communications interfaces feature multiple DMA controllers and are capable of simultaneously transmitting a received message, such as a write payload, to multiple independent buffers. Like the storage controllers discussed in FIGS. 5 and 6, the communications interfaces shown in FIG. 9 may not be directly connected to their respective storage controllers, but may still be on an independent back-side bus which connects to the controllers through bridges. The storage controllers (as well as their communications interfaces) are coupled together by uni-cast rather than multi-cast fabric. The storage controllers include separate NVRAM, NVRAM 907 for storage controller 905 and NVRAM 917 for storage controller 915.

A cache manager 937 in storage controller 905 may partition available write-back cache storage, and establish mirroring relationships between the storage controller and partitions. A fabric manager 939 may provide back-side addresses for chosen partitions. An incoming write request may be decoded by a target 935 of storage controller and forwarded to cache manager 937. Cache manager 937 may allocate appropriate buffers to receive the copies of the payload of the write request. Target 935 may construct an appropriate multi-buffer read request and submit it to communications interface. Unlike the cache manager in storage controllers that feature multi-cast operation, cache manager 937 may return multiple back-side fabric addresses, each of which may be provided to communications interface 910 as an intended recipient of the payload.

A write payload arriving at communications interface 910 may be sent to storage controller 905 and storage controller 915 (with communications interface 910 performing the mirroring operation without assistance of a multi-cast fabric through the use of multiple DMA operations), where they may be stored. A similar mirroring operation may occur for write requests arriving at communications interface 920.

Figure 10:
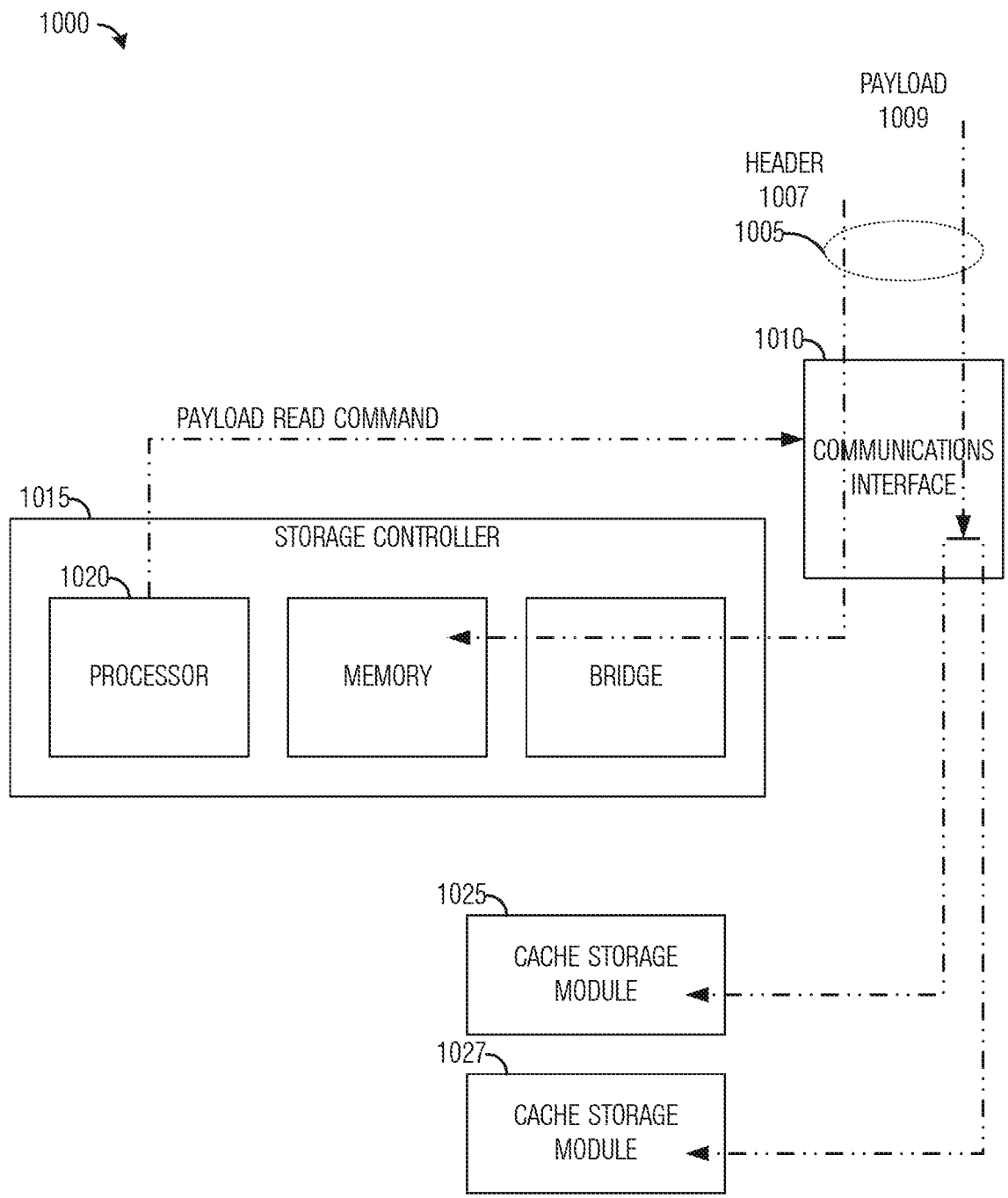
FIG. 10 illustrates an example data flow diagram, highlighting mirrored operation without multi-cast fabric, according to example embodiments described herein.

FIG. 10 illustrates an example data flow diagram 1000, highlighting mirrored operation. Data flow diagram 1000 may be illustrative of data flows for storage system 900 shown in FIG. 9. A write request 1005 comprising a header 1007 and a payload (data) 1009 may be received by communications interface 1010. Since communications interface 1010 supports header/data separation, only header 1007 is initially delivered to storage controller 1015. Header 1007 is examined by processor 1020 to determine where payload 1009 is to be stored. As an illustrative example, a mirroring group is selected and an appropriate buffer from within the mirroring group is selected. In a situation when buffers within cache storage partitions are maintained in fixed size pages, multiple buffers may need to be allocated for payloads larger than the defined page size.

Mirroring addresses (corresponding to addresses of the buffers in the mirroring group) may be determined by processor 1020. Processor 1020 may also generate a read request in accordance with the chosen buffers and provide the read request to communications interface 1010. Communications interface 1010 may initiate DMA transfers to the chosen buffers, which will result in payload 1009 being sent to buffers in the mirroring group, such as those in cache storage module 1025 and cache storage module 1027, for example. If the transfer completes successfully, cache indices may be updated.

Figures 11A, 11B:
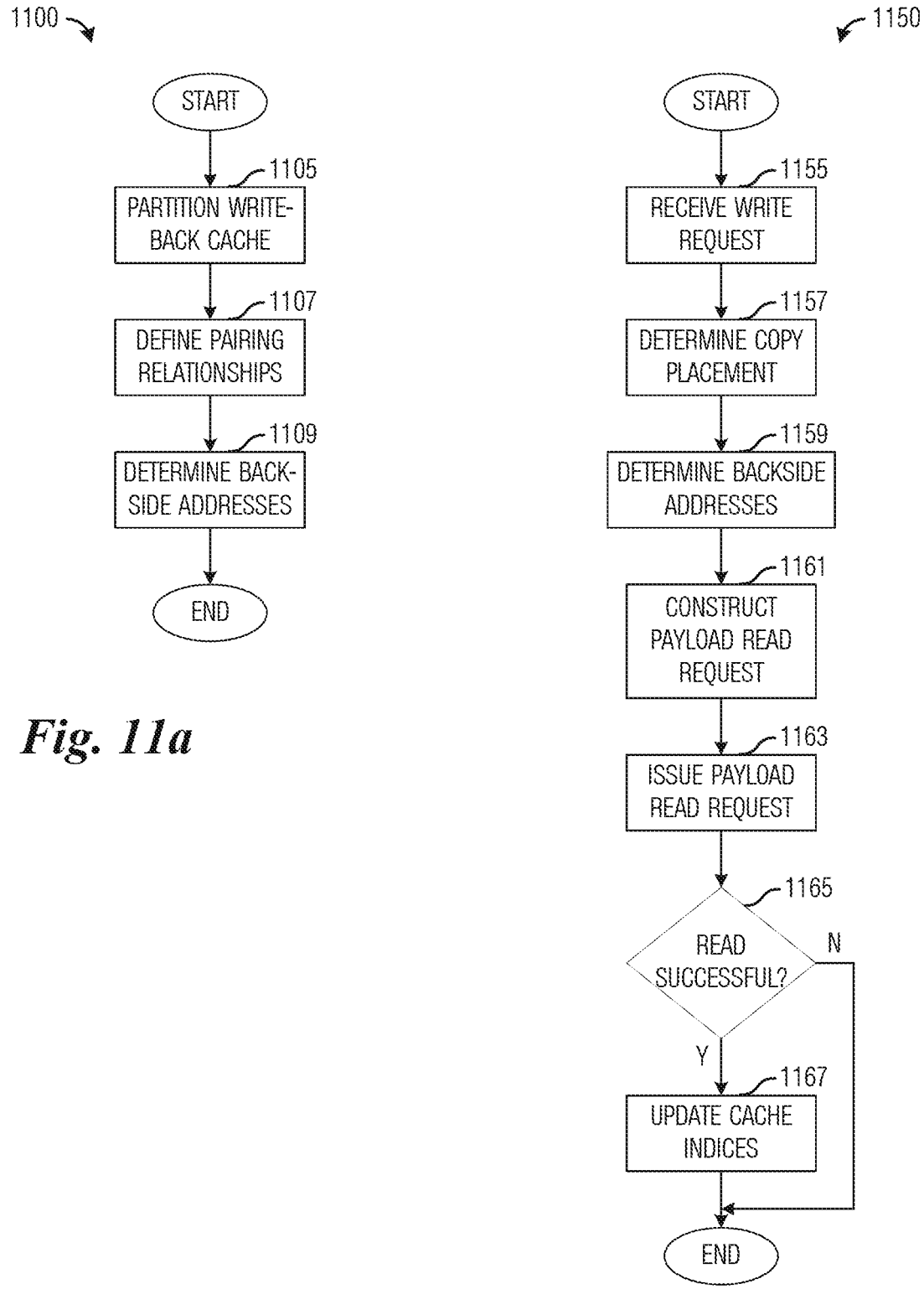
FIG. 11a illustrates a flow diagram of example operations occurring in a processor of a storage controller participating in initialization of a storage system for mirroring write requests according to example embodiments described herein.
FIG. 11b illustrates a flow diagram of example operations occurring in a processor of a storage controller participating in processing a write request in a storage system utilizing mirrored write requests according to example embodiments described herein.

FIG. 11a illustrates a flow diagram of example operations 1100 occurring in a processor of a storage controller participating in initialization of a storage system for mirroring write requests. The initializing of the storage system may begin with the partitioning of the write-back cache (e.g., volatile or non-volatile memory) into smaller cache storage partitions (block 1105). The defining of pairing relationships may be performed (block 1107). Considerations discussed for FIG. 8a also apply to blocks 1105 and 1107. Back-side addresses may be determined (block 1109). Since there is no multi-cast address space to be defined, the determination of the back-side addresses associated with the defined cache storage partitions is a very simple process.

FIG. 11b illustrates a flow diagram of example operations 1150 occurring in a processor of a storage controller participating in processing a write request in a storage system utilizing mirrored write requests. The processing of a write request may begin with receiving a write request, which comprises a header and a data payload (block 1155). The write request may be received by a communications interface. Since the communications interface may support header/payload separation, the header may be delivered to the storage controller.

The header may be processed. The processing of the header may include determining where to store the payload of the write request (block 1157). The back-side uni-cast addresses may be determined (block 1159). The uni-cast addresses are the addresses that will result in the storage of the payload to the buffers. The addresses may be determined as a base address for the selected mirroring group plus an offset of the selected buffer within the mirroring group.

A read request may be generated (block 1161). The read request may be generated from the uni-cast addresses. If multiple buffers have been selected because the payload is too large to fit in a single buffer, the read request may include a scatter list of multiple buffers, with each successive buffer to receive a consecutive page of the payload. The read request may be issued (block 1163). The read request may be sent to the communications interface, instructing it to transfer the payload to the chosen buffers. The communications interface may initiate DMA transfers to the addresses specified in the read request.

A check may be performed to determine if the read request was successful (block 1165). If the read request was successful, cache indices may be updated to reflect the new cache contents (block 1167).

Although the present disclosure and its advantages have been described in detail, it should be understood that various changes, substitutions and alterations can be made herein without departing from the spirit and scope of the disclosure as defined by the appended claims.

What is claimed is:

1. A write-back cache comprising:
   a plurality of cache storage modules configured to store data, the plurality of cache storage modules comprising a combination of volatile and non-volatile cache storage modules partitioned into cache storage partitions that are organized into mirroring groups;
   a processor operatively coupled to the plurality of cache storage modules; and
   a non-transitory computer readable storage medium storing programming for execution by the processor, the programming including instructions to select a mirroring group for a data payload portion of a single write request, the selected mirroring group including at least a non-volatile buffer and a volatile buffer, and to transfer the data payload portion of the single write request in parallel into both the non-volatile buffer and the volatile buffer of the selected mirroring group, wherein the plurality of cache storage modules are divided into a number of cache storage partitions that is a common multiple of M and [S*C], where S is a number of storage controllers, C is a number of copies of the data payload portion stored in the plurality of cache storage modules, and M is a number of cache storage modules.

2. The write-back cache of claim 1, wherein the plurality of cache storage modules are divided into a number of equal-sized cache storage partitions that is a least common multiple of M and [S*C].

3. The write-back cache of claim 2, wherein P cache storage partitions are organized into P/C mirroring groups, where P is an integer value, C is the number of copies, and each mirroring group comprises C cache storage locations from distinct cache storage modules.

4. The write-back cache of claim 1, wherein the plurality of cache storage modules are coupled to the processor through a multi-cast backside fabric configured to generate a multi-cast group for each mirroring group, and wherein the programming includes instructions to direct a communications interface to deliver the data payload to an address corresponding to a multi-cast group associated with the selected mirroring group.

5. The write-back cache of claim 1, wherein the plurality of cache storage modules are coupled to the processor through a uni-cast backside fabric and a communications interface.

6. The write-back cache of claim 5, wherein the plurality of cache storage modules are coupled to the processor through a uni-cast backside fabric and a communications interface.

7. The write-back cache of claim 6, wherein the communications interface is capable of substantially simultaneous transfers of data to multiple buffers.

8. The write-back cache of claim 7, wherein the programming includes instructions to send a copy of the data payload to each buffer of the selected mirroring group.

9. A method for operating a write-back cache, the method comprising:
   storing data in a plurality of cache storage modules, the plurality of cache storage modules comprising a combination of volatile and non-volatile cache storage modules partitioned into cache storage partitions that are organized into mirroring groups;
   selecting a mirroring group for a data payload portion of a single write request, the selected mirroring group including at least a non-volatile buffer and a volatile buffer; and
   transferring the data payload portion of the single write request in parallel into both the non-volatile buffer and the volatile buffer of the selected mirroring group, wherein the plurality of cache storage modules are divided into a number of cache storage partitions that is a common multiple of M and [S*C], where S is a number of storage controllers, C is a number of copies of the data payload portion stored in the plurality of cache storage modules, and M is a number of cache storage modules.

10. The method of claim 9, wherein the plurality of cache storage modules are divided into a number of equal-sized cache storage partitions that is a least common multiple of M and [S*C].

11. The method of claim 9, wherein P cache storage partitions are organized into P/C mirroring groups, where P is an integer value, C is the number of copies, and each mirroring group comprises C cache storage locations from distinct cache storage modules.

12. The method of claim 9, wherein the plurality of cache storage modules are coupled to a processor through a multi-cast backside fabric configured to generate a multi-cast group for each mirroring group.

13. The method of claim 12, further comprising:
directing a communications interface to deliver the data payload to an address corresponding to a multi-cast group associated with the selected mirroring group.

14. The method of claim 9, wherein the plurality of cache storage modules are coupled to a processor through a uni-cast backside fabric and a communications interface, wherein the communications interface is capable of substantially simultaneous transfers of data to multiple buffers.

15. The method of claim 14, further comprising:
sending a copy of the data payload to each buffer of the selected mirroring group.

16. A computer program product comprising a non-transitory computer readable storage medium storing programming, the programming including instructions to:
store data in a plurality of cache storage modules, the plurality of cache storage modules comprising a combination of volatile and non-volatile cache storage modules partitioned into cache storage partitions that are organized into mirroring groups;
select a mirroring group for a data payload portion of a single write request, the selected mirroring group including at least a non-volatile buffer and a volatile buffer; and
transfer the data payload portion of the single write request in parallel into both the non-volatile buffer and the volatile buffer of the selected mirroring group, wherein the plurality of cache storage modules are divided into a number of cache storage partitions that is a common multiple of M and [S*C], where S is a number of storage controllers, C is a number of copies of the data payload portion stored in the plurality of cache storage modules, and M is a number of cache storage modules.

17. The computer program product of claim 16, wherein the plurality of cache storage modules are divided into a number of equal-sized cache storage partitions that is a least common multiple of M and [S*C].

18. The computer program product of claim 16, wherein P cache storage partitions are organized into P/C mirroring groups, where P is an integer value, C is the number of copies, and each mirroring group comprises C cache storage locations from distinct cache storage modules.

19. The computer program product of claim 16, wherein the plurality of cache storage modules are coupled to a processor through a multi-cast backside fabric configured to generate a multi-cast group for each mirroring group, wherein the programming includes instructions to direct a communications interface to deliver the data payload to an address corresponding to a multi-cast group associated with the selected mirroring group.

20. The computer program product of claim 16, wherein the plurality of cache storage modules are coupled to a processor through a uni-cast backside fabric and a communications interface, wherein the communications interface is capable of substantially simultaneous transfers of data to multiple buffers, and wherein the programming further includes instructions to send a copy of the data payload to each buffer of the selected mirroring group.

* * * * *